(12) United States Patent
Xiao et al.

(10) Patent No.: US 12,537,232 B2
(45) Date of Patent: Jan. 27, 2026

(54) BATTERY CELL, BATTERY, ELECTRICAL APPARATUS, AND MANUFACTURING METHOD FOR BATTERY CELL

(71) Applicant: CONTEMPORARY AMPEREX TECHNOLOGY (HONG KONG) LIMITED, Hong Kong (CN)

(72) Inventors: Haihe Xiao, Ningde (CN); Xiaowen Zhang, Ningde (CN); Baiqing Li, Ningde (CN); Haizu Jin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 512 days.

(21) Appl. No.: 18/099,791

(22) Filed: Jan. 20, 2023

(65) Prior Publication Data

US 2023/0155184 A1   May 18, 2023

Related U.S. Application Data

(63) Continuation of application No. PCT/CN2021/120669, filed on Sep. 26, 2021.

(51) Int. Cl.
*H01M 10/42* (2006.01)
*H01M 50/172* (2021.01)
*H01M 50/533* (2021.01)

(52) U.S. Cl.
CPC ..... *H01M 10/4235* (2013.01); *H01M 50/172* (2021.01); *H01M 50/533* (2021.01)

(58) Field of Classification Search
CPC ........... H01M 10/4235; H01M 50/533; H01M 50/172
See application file for complete search history.

(56) References Cited

U.S. PATENT DOCUMENTS

2018/0254467 A1* 9/2018 Jeong ................ H01M 50/543
2020/0119328 A1* 4/2020 Zheng ................ H01M 50/55

FOREIGN PATENT DOCUMENTS

CN   212571272 U   2/2021
CN   112952300 A   6/2021
(Continued)

OTHER PUBLICATIONS

JP 2000100415 MT (Year: 2000).*
(Continued)

*Primary Examiner* — Alexander Usyatinsky
(74) *Attorney, Agent, or Firm* — ANOVA LAW GROUP, PLLC

(57) ABSTRACT

A battery cell, a battery, an electrical apparatus, and a manufacturing method for a battery cell are disclosed. The battery cell includes an electrode assembly, and the electrode assembly includes a main body part and a tab extending from the main body part. The tab includes a first bending portion and a straight portion, and the straight portion is connected to the main body part through the first bending portion; a second bending portion is formed on the straight portion, and the second bending portion protrudes towards the side of the main body part. The arrangement of the second bending portion generates a protruding deformation towards the side of the main body part, which makes the layers of the tab close together, forming a local binding of the tab, and increasing the resistance to separation between the layers of the tab, thereby improving the safety of the battery.

17 Claims, 10 Drawing Sheets

(56) References Cited

FOREIGN PATENT DOCUMENTS

| | | | | |
|---|---|---|---|---|
| CN | 213636154 U | 7/2021 | | |
| DE | 102018212337 A1 | * 1/2020 | ………. | H01M 50/531 |
| JP | 2000100415 A | * 4/2000 | | |
| JP | 2014017053 A | 1/2014 | | |
| JP | 2021022482 A | 2/2021 | | |
| JP | 2021044148 A | 3/2021 | | |
| WO | WO2022047791 A1 | 3/2022 | | |

OTHER PUBLICATIONS

DE 102018212337 MT (Year: 2018).*
The decision of JPO to grant a Patent for Application JP 2023501781 (Year: 2024).*
KR Decision to grant a Patent (Year: 2025).*
The European Patent Office (EPO) The Extended European Search Report for Application No. 21949527.2 Mar. 1, 2024 8 Pages.
The Japan Patent Office (JPO) Notification of Reasons for Refusal for Application No. 2023-501781 and Translation Mar. 4, 2024 6 Pages.
International Search Report and Written Opinion, PCT/CN2021/120669, Apr. 29, 2022, 6 pgs.

* cited by examiner

BATTERY CELL, BATTERY, ELECTRICAL APPARATUS, AND MANUFACTURING METHOD FOR BATTERY CELL

CROSS REFERENCE TO RELATED APPLICATION

This application is a continuation application of PCT Patent Application No. PCT/CN2021/120669, entitled "BATTERY CELL, BATTERY, ELECTRICAL APPARATUS, AND MANUFACTURING METHOD FOR BATTERY CELL" filed on Sep. 26, 2021, which is incorporated herein by reference in its entirety.

TECHNICAL FIELD

The present application relates to the technical field of batteries, and in particular, to a battery cell, a battery, an electrical apparatus, and a manufacturing method for a battery cell.

BACKGROUND ART

Energy saving and emission reduction are key to the sustainable development of automobile industry, and electric vehicles have become an important part of the sustainable development of automotive industry due to their advantages of energy saving and environmental protection. For electric vehicles, battery technology is an important factor related to their development.

An electrode assembly is an important unit of a battery cell. In order to improve energy density of a battery, tabs of the electrode assembly need to be bent to save space. However, when tabs of a plurality of layers of tab sheets are bent, safety performance of the battery may be affected.

SUMMARY OF THE INVENTION

In view of the above problems, a battery cell, a battery, an electrical apparatus, and a manufacturing method for a battery cell are provided in the present application, so as to alleviate the battery safety problem caused when a tab is bent.

In a first aspect, a battery cell including an electrode assembly is provided in the present application, and the electrode assembly includes a main body part and a tab extending from the main body part, wherein the tab is formed by bending a plurality of tab sheets stacked in layers; the tab includes a first bending portion and a straight portion, and the straight portion is connected to the main body part through the first bending portion; a second bending portion is formed at least on the straight portion, and the second bending portion protrudes towards the side of the main body part.

In the technical solution of the embodiments of the present application, the arrangement of the second bending portion makes a part of the tab generate a protruding deformation towards the side of the main body part, and this deformation makes the layers of the tab close together, forming a local binding of the tab, and increasing the resistance to separation between the layers of the tab, thereby avoiding bifurcation of the tab and improving the safety of the battery.

In some embodiments, second bending portions are formed on the straight portion and the first bending portion. The second bending portion is formed on the straight portion and the first bending portion, so that an area where the tab is bound is larger, and the bifurcation of the tab is further avoided.

In some embodiments, the first bending portion has a first bending axis, the second bending portion has a second bending axis, and the second bending axis and the first bending axis have an included angle or are parallel. The second bending portion makes the layers of the tab converge to the middle of the second bending portion, and the separation resistance is greater, thereby avoiding the bifurcation of the tab.

In some embodiments, the battery cell further includes a case, an end cover, and a pressing-down structure. The case has an opening, the end cover is arranged at the opening to close the opening, and the tab extends from the main body part to the side of the end cover. The pressing-down structure is arranged between the tab and the end cover, and the pressing-down structure abuts against the tab, so that the tab forms the second bending portion. The pressing-down structure is arranged between the tab and the end cover, so that after the battery cell is assembled, the pressing-down structure can continue to abut against the tab, and therefore, the shape of the second bending portion on the tab is maintained continuously, thereby effectively ensuring the continuous converging effect between the various layers of tab sheets of the tab, and preventing the tab bifurcation.

In some embodiments, the battery cell further includes a terminal post arranged on the end cover and an adapter plate. The adapter plate is configured to connect the terminal post and the straight portion of the tab, and the pressing-down structure is arranged at a position of the adapter plate that cooperates with the straight portion. By arranging the pressing-down structure on the adapter plate and at the position of the adapter plate that cooperates with the straight portion, after the adapter plate is connected to the straight portion of the tab, the pressing-down structure can naturally form downward pressing on the tab. Therefore, this arrangement facilitates assembling of the battery cell.

In some embodiments, the battery cell further includes a terminal post arranged on the end cover and an adapter plate. The adapter plate is configured to connect the terminal post and the straight portion of the tab, and the pressing-down structure is arranged at positions where the adapter plate cooperates with the straight portion and the first bending portion. By arranging the pressing-down structure at the positions where the adapter plate cooperates with the straight portion and the first bending portion, the second bending portion is formed on the straight portion and the first bending portion of the tab, so that an area where the tab is bound is larger, and the bifurcation of the tab is further avoided.

In some embodiments, the pressing-down structure includes a protruding portion arranged on the adapter plate. The protruding portion abuts against an upper surface of the tab so that the tab forms the second bending portion facing one side of the main body part.

In some embodiments, the height of the protruding portion is 1 mm to 5 mm. Setting the height of the protruding portion within the above range can ensure that a protrusion depth of the second bending portion formed by the tab forms effectively binding for the layers of tab sheets.

In some embodiments, the height of the protruding portion gradually increases in a direction from the first bending portion to the straight portion. A free end of the straight portion is easier to disperse, and therefore, in order to make deformation of the free end side of the straight portion larger to form a larger binding force, the height of the protruding portion is set to gradually increase in the direction from the first bending portion to the straight portion.

In some embodiments, the protruding portion and the adapter plate are formed integrally. By integrally forming the protruding portion and the adapter plate, when the battery cell is assembled, directly connecting the adapter plate and the tab can at the same time realize the abutment of the protruding portion against the tab, so as to form the second bending portion. Therefore, the assembling process of the battery cell can be simplified.

In some embodiments, the protruding portion and the adapter plate are separated structures, and the protruding portion is connected to the adapter plate. The protruding portion and the adapter plate are separated structures, and in this way, a position of the protruding portion on the adapter plate can be changed according to an actual requirement during the assembling.

In some embodiments, the protruding portion has a contact surface abutting against the tab, and the contact surface includes a curved surface. The contact surface directly abuts against the tab, and therefore, setting the contact surface as the curved surface can avoid damage to the tab when abutting against the tab.

In some embodiments, the adapter plate includes a first connection region connected to the terminal post and a second connection region connected to the tab. The pressing-down structure and the first connection region are located at both sides of the second connection region. The pressing-down structure and the first connection region are located on both sides of the second connection region, respectively, and in this way, the arrangement of the pressing-down structure has no effect on the connections between the adapter plate and the terminal post and between the adapter plate and the tab. During assembling, the original process is still used for connecting the adapter plate to the terminal post and to the tab, and the pressing-down structure arranged on the adapter plate can naturally form pressing against the tab.

In some embodiments, the adapter plate includes a first connection region connected to the terminal post, and a second connection region and a third connection region connected to the tab. The pressing-down structure is located between the second connection region and the third connection region. The pressing-down structure is arranged between the second connection region and the third connection region, and therefore, both sides of the pressing-down structure are subject to a connection force between the adapter plate and the tab. Under the limit of the connection forces on the both sides, the pressing-down structure has a small degree of freedom in a height direction, and therefore, the abutment against the tab can be maintained continuously.

In some embodiments, the battery cell further includes a terminal post arranged on the end cover and an adapter plate. The adapter plate is configured to connect the terminal post and the tab, and the pressing-down structure is arranged on the side of the end cover facing the tab and at a position that is not blocked by the adapter plate. The end cover is provided with the pressing-down structure, so that when the end cover is installed at the opening of the case, the pressing-down structure can press against the tab so that the tab forms the second bending portion.

In some embodiments, in a direction of the first bending axis, the pressing-down structure abuts against a portion of the tab close to the middle of the tab. The pressing-down structure abuts against the portion of the tab close to the middle of the tab, and therefore, in a first direction, the second bending portion formed by the pressing-down structure is located in the middle of the tab, so that portions of the tab located at both sides of the second bending portion are subject to more balanced binding forces, and each part of the tab can receive a balanced binding force.

In some embodiments, the battery cell includes two or more electrode assemblies arranged side by side, and the pressing-down structure abuts against at least two tabs of the two or more electrode assemblies. The pressing-down structure abuts against at least two tabs of the two or more electrode assemblies, so that there is no need to provide a special pressing-down structure for each tab, thereby simplifying the assembling process of the battery cell and simplifying the structure of the battery cell.

In some embodiments, the electrode assembly includes a positive tab and a negative tab, and a second bending portion is formed on straight portions of the positive tab and the negative tab, respectively. The second bending portion is formed on the straight portions of the positive tab and the negative tab, respectively, and in this way, the positive tab and the negative tab can be effectively bifurcated, thereby further improving the safety of the battery cell.

In a second aspect, a battery is provided in the present application, and includes the battery cell in the above embodiment.

In a third aspect, an electrical apparatus is provided in the present application, and includes the battery in the above embodiment, and the battery is configured to provide electrical energy.

In a fourth aspect, a manufacturing method for a battery cell is provided in the present application, and includes the following steps:

providing an electrode assembly, the electrode assembly including a main body part and a tab, wherein the tab includes a first bending portion and a straight portion, the straight portion is connected to the main body part through the first bending portion, a second bending portion is formed at least on the straight portion, and the second bending portion protrudes towards the side of the main body part.

In some embodiments, the manufacturing method further includes providing a case having an opening, an end cover, and a pressing-down structure, the pressing-down structure being arranged between the tab and the end cover, placing the electrode assembly within the case and allowing the tab of the electrode assembly to be located on one side of the opening of the case. When the end cover is installed at the opening of the case to close the opening, the pressing-down structure is abutted against the tab to form the second bending portion of the tab.

In some embodiments, the manufacturing method further includes providing a terminal post and an adapter plate, connecting a first end of the adapter plate to the terminal post, arranging the pressing-down structure at a second end of the adapter plate, and abutting the pressing-down structure against the tab.

In some embodiments, the manufacturing method further includes arranging the pressing-down structure on the end cover, and installing the end cover at the opening of the case so that the pressing-down structure abuts against the tab.

The above description is only a summary of the technical solutions of the present application. In order to be able to understand the technical means of the present application more clearly, the technical means can be implemented according to the content of the specification. Furthermore, to make the above and other objectives, features and advantages of the present application more comprehensible, specific implementations of the present application are exemplified below.

DESCRIPTION OF DRAWINGS

In order to illustrate the technical solutions of the embodiments of the present application more clearly, the drawings required in the embodiments of the present application will be briefly introduced below. Obviously, the drawings described below are only some embodiments of the present application. For those of ordinary skill in the art, other drawings can also be obtained according to the drawings without any creative effort.

Figure 1:
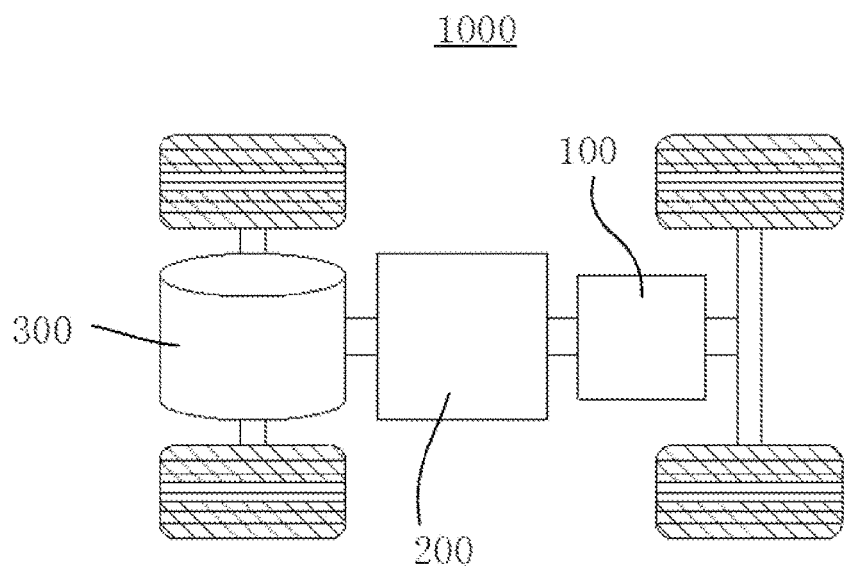
FIG. 1 is a schematic structural diagram of a vehicle according to some embodiments of the present application.

In the drawings, the drawings are not drawn to actual scale.

Reference numerals in Detailed Description are as follows:

Vehicle 1000;
Battery 100, Controller 200, Motor 300;
Box body 10, First portion 11, Second portion 12;
Battery cell 20, Case 21, End cover 22, Protruding portion 221, Electrode assembly 23, Main body part 231. Tab 232. First bending portion 232a, Straight portion 232b, Second bending portion 232c, Terminal post 24, Adapter plate 26, Protruding portion 261.

DETAILED DESCRIPTION

Embodiments of the technical solutions of the present application will be described in detail below in conjunction with the drawings. The following embodiments are only used to more clearly illustrate the technical solution of the present application, and therefore are only used as examples and cannot be used to limit the scope of protection of the present application.

Unless otherwise defined, all technical and scientific terms used herein have the same meaning as commonly understood by those skilled in the art belonging to the technical field of the present application; the terms used herein are intended only for the purpose of describing specific embodiments and are not intended to limit the present application: the terms "including" and "having" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated. In the description of the embodiments of the present application, the meaning of "a plurality of" is two or more, unless otherwise explicitly and specifically defined.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is only an association relationship for describing associated objects, indicating that three relationships may exist. For example, A and/or B may represent three situations: A exists alone, both A and B exist, and B exists alone. In addition, the character "/" herein generally means that the associated objects before and after it are in an "or" relationship.

In the description of the embodiments of the present application, the term "plurality of" refers to two or more (including two), and similarly, "multiple groups" refers to two or more (including two) groups, and "multiple sheets" refers to two or more (including two) sheets.

In the description of the embodiments of the present application, the orientation or location relationships indicated by the technical terms "center", "longitudinal", "transverse", "length", "width", "thickness", "up", "down", "front", "back", "left", "right", "vertical", "horizontal". "top", "bottom", "inside", "outside". "clockwise", "counterclockwise", "axial". "radial", "circumferential" and the like are based on the orientation or location relationships shown in the drawings, and are only for convenience and simplification of the description of the embodiments of the present application, but do not indicate or imply that the apparatuses or elements referred to must have particular orientations, be constructed and operated in particular orientations, and therefore cannot be construed as a limitation of the embodiments of the present application.

In the description of the embodiments of the present application, unless otherwise expressly specified and limited, the technical terms "mounting," "connected." "connecting," "fixing", and the like shall be understood in a broad sense, which, for example, may be a fixed connection, or a detachable connection or an integral connection; may also be a mechanical connection, or an electrical connection; may be a direct connection, or an indirect connection through an intermediate medium, and may be a communication within two elements or an interactive relationship between two elements. For those of ordinary skill in the art, the specific meanings of the above terms in the embodiments of the present application can be understood according to specific situations.

A current battery cell generally includes a case and an electrode assembly accommodated in the case, and the case is filled with an electrolyte solution. The electrode assembly is a component in which an electrochemical reaction takes place in the battery cell. One or more electrode assemblies may be contained within the case. The electrode assembly is mainly formed by winding or stacking a positive electrode sheet and a negative electrode sheet, and a separator is usually arranged between the positive electrode sheet and the negative electrode sheet. Portions of the positive electrode sheet and the negative electrode sheet with active materials constitute a main body part of the electrode assembly, and portions of the positive electrode sheet and the negative electrode sheet without active materials constitute tabs, respectively. In order to improve the overcurrent capability, the tab includes multi-layer tab sheets arranged in layers. In charging and discharging processes of the battery cell, the positive active material and the negative active material react with the electrolyte solution, and the tabs are connected to terminal posts to form a current loop.

During processing of the battery cell, in order to save space and improve the energy density, it is generally necessary to bend the tab with the multi-layer tab sheets. After being bent, the tab includes a first bending portion connected to the main body part and a straight portion. The inventors of the present application noticed during the research that the tab includes multiple layers of tabs, and therefore, after bending, the layers of the tab are prone to bifurcation. In addition, the bifurcation between the layers of the tab may also cause the tab to be inserted into the main body part upside down to result in short-circuit with the electrode sheet below the tab, thereby causing a safety problem.

In order to alleviate the problem that the tab is prone to bifurcation, the inventors have found that a part of the tab may be made to protrude and deform, and the local deformation can form binding on the tab, thereby increasing a resistance to separation between the layers of the tab, and avoiding the tab bifurcation. After further in-depth research, the inventors found that a part of the tab can be protruded and deformed towards the side of the main body part, so as to avoid increasing the volume occupied by the electrode assembly on the basis of avoiding the tab bifurcation.

Based on the above considerations, in order to alleviate the problem that the tab is prone to bifurcation, the inventors designed a battery cell after in-depth research, in which at least a second bending portion is formed on a straight portion, and the second bending portion protrudes towards the side of the main body part. The arrangement of the second bending portion makes a part of the tab generate a protruding deformation towards the side of the main body part, and this deformation makes the layers of the tab close together, forming a local binding of the tab, and increasing the resistance to separation between the layers of the tab, thereby avoiding the tab bifurcation.

The battery cell disclosed in the embodiments of the present application can be used, but not limited to, in electrical apparatus such as a vehicle, a ship, or an aircraft. A power supply system including the battery cells and batteries disclosed in the present application may be used for forming an electrical apparatus.

Embodiments of the present application provide an electrical apparatus that uses a battery as a power supply, and the electrical apparatus may be, but is not limited to, a mobile phone, a tablet, a laptop, an electric toy, an electric tool, a battery vehicle, an electric vehicle, a ship, a spacecraft, and so on. The electric toy may include a fixed or mobile electric toy, such as a game console, an electric car toy, an electric ship toy, and an electric airplane toy. The spacecraft may include an airplane, a rocket, a space shuttle, a spaceship, and the like.

In the following embodiments, for the convenience of description, an electrical apparatus according to an embodiment of the present application being vehicle 1000 is used as an example for description.

Referring to FIG. 1, FIG. 1 is a schematic structural diagram of vehicle 1000 according to some embodiments of the present application. Vehicle 1000 may be a fuel vehicle, a gas vehicle, or a new energy vehicle, and the new energy vehicle may be an all-electric vehicle, a hybrid electric vehicle, an extended range electric vehicle, or the like. The interior of vehicle 1000 is provided with battery 100, and battery 100 may be provided at the bottom or head or tail of vehicle 1000. Battery 100 may be used to power vehicle 1000, for example, battery 100 may serve as an operating power source for vehicle 1000. Vehicle 1000 may further include controller 200 and motor 300, wherein controller 200 is used for controlling battery 100 to power motor 300, for example, for the operating power demand when vehicle 1000 is starting, navigating, and driving.

In some embodiments of the present application, battery 100 not only may serve as an operating power source of vehicle 1000, but also may serve as a driving power source of vehicle 1000, thus replacing or partially replacing fuel or natural gas to provide driving power for vehicle 1000.

Figure 2:
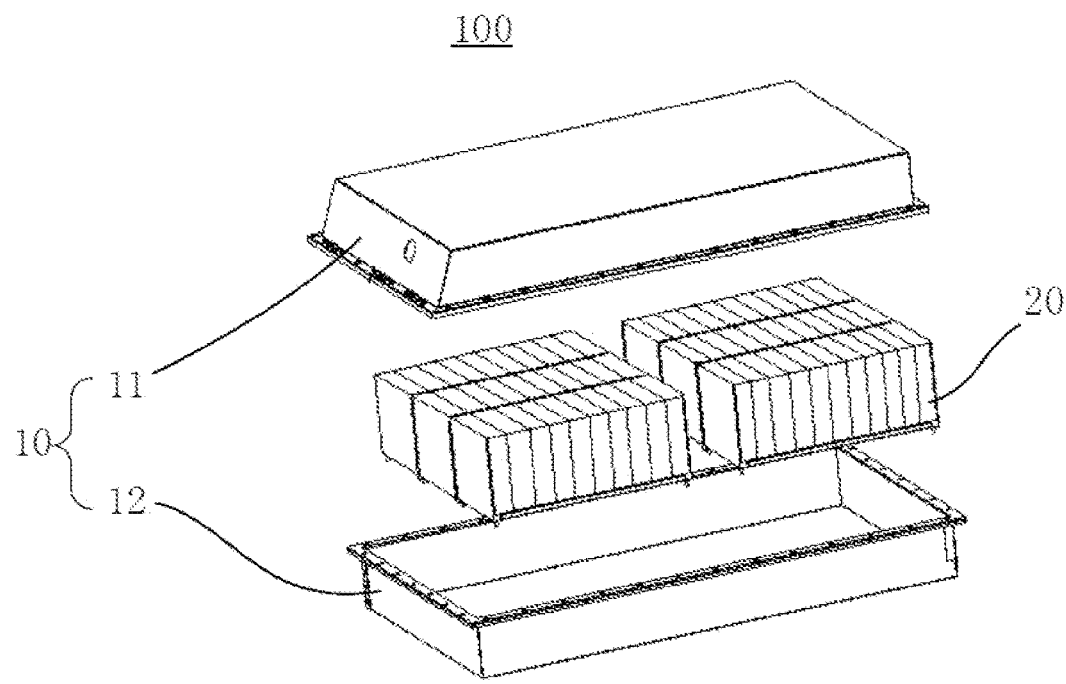
FIG. 2 is a schematic exploded structural diagram of a battery according to some embodiments of the present application.

Referring to FIG. 2, FIG. 2 is an exploded diagram of battery 100 according to some embodiments of the present application. Battery 100 includes box body 10 and battery cell 20. Battery cell 20 is accommodated in box body 10. Here, box body 10 is used for providing an accommodating space for battery cell 20, and box body 10 may be of various structures. In some embodiments, box body 10 may include first portion 11 and second portion 12. First portion 11 and second portion 12 cover each other, and first portion 11 and second portion 12 together define an accommodating space for accommodating battery cell 20. Second portion 12 may be a hollow structure with one end open, first portion 11 may be a plate-like structure, and first portion 11 covers an open side of second portion 12, so that first portion 11 and second portion 12 together define the accommodating space. First portion 11 and second portion 12 may also be hollow structures with one side open, and the open side of first portion 11 covers the open side of second portion 12. Of course, box body 10 formed by first portion 11 and second portion 12 may be of various shapes, such as a cylinder and a cuboid.

In battery 100, there may be a plurality of battery cells 20, and the plurality of battery cells 20 may be connected in series or parallel or be in parallel-series connection, wherein the parallel-series connection means that the plurality of battery cells 20 are connected in both series and parallel. The plurality of battery cells 20 may be directly connected in series or parallel or be in parallel-series connection together, and then, the whole of the plurality of battery cells 20 is accommodated within box body 10. Of course, battery 100 may also be such that a plurality of battery cells 20 are first connected in series or parallel or in parallel-series connection to form a battery module, and a plurality of battery modules are connected in series or parallel or in parallel-series connection to form a whole and is accommodated within box body 10. Battery 100 may further include other structures, for example, battery 100 may further include a bus component for electrically connecting the plurality of battery cells 20.

Each battery cell 20 may be a secondary battery or a primary battery, and may also be a lithium-sulfur battery, a sodium-ion battery, or a magnesium-ion battery, but is not limited thereto. Battery cell 20 may be in the shape of a cylinder, a flat body, a cuboid, or others.

Figure 3:
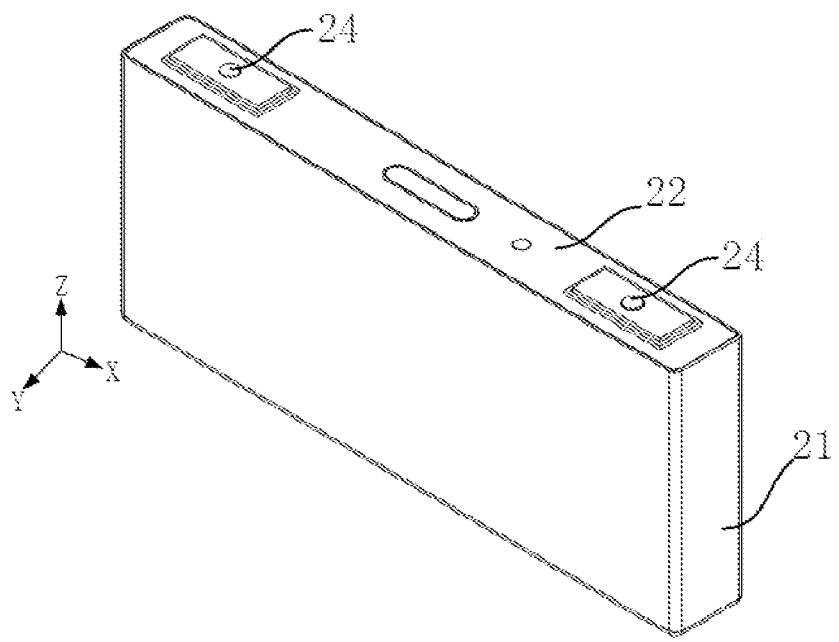
FIG. 3 is a schematic three-dimensional structural diagram of a battery cell according to some embodiments of the present application.

Referring to FIG. 3, FIG. 3 is a schematic three-dimensional structural diagram of battery cell 20 according to some embodiments of the present application. As shown in FIG. 3 and referring to FIG. 5, battery cell 20 includes case 21, end cover 22, electrode assembly 23, terminal post 24, and other functional components.

Case 21 is an assembly that forms an internal environment of battery cell 20, wherein the formed internal environment may be used for accommodating electrode assembly 23, the electrolyte solution, and other components. Case 22 may be of various shapes and sizes, such as rectangular parallelepiped, cylindrical, and hexagonal. Specifically, the shape of case 22 may be determined according to the specific shape and size of electrode assembly 23. Case 22 may be made of various materials, such as copper, iron, aluminum, stainless steel, aluminum alloy, and plastic, which is not particularly limited in the embodiments of the present application.

End cover 22 refers to a component that covers an opening of case 21 to isolate the internal environment of battery cell 20 from the external environment. Without limitation, the shape of end cover 22 may be adapted to the shape of case 21 to fit case 21. Optionally, end cover 22 may be made of a material with certain hardness and strength (such as aluminum alloy), and in this way, end cover 22 is not easily deformed when it is squeezed and collided, so that battery cell 20 can have a higher structural strength and safety performance may also be improved. Functional components such as terminal post 24 may be provided on end cover 21. Terminal post 24 is used for electrical connection with electrode assembly 23 for outputting or inputting the electric energy of battery cells 20. In some embodiments, end cover 22 may also be provided with a pressure relief mechanism for releasing an internal pressure when the internal pressure or temperature of battery cell 20 reaches a threshold value. The material of end cover 22 may also be various, such as, copper, iron, aluminum, stainless steel, aluminum alloy, and plastic, which is not particularly limited in the embodiments of the present application. In some embodiments, an insulating member may also be arranged on an inner side of end cover 22, and the insulating member may be used for isolating electrical connection components in case 21 from end cover 22, so as to reduce the risk of short circuit. For example, the insulating member may be plastic, rubber, or the like.

Case 21 and end cover 22 may be separate components. Without limitation, case 21 and end cover 22 may also be integrated. Specifically, case 21 and end cover 22 may form a common connection surface before other components are put into the case. When it is necessary to encapsulate the interior of case 21, end cover 22 is made to cover case 21.

Electrode assembly 23 is a component in which an electrochemical reaction takes place in battery cell 20. One or more electrode assemblies 23 may be contained in case 21. Electrode assembly 23 is mainly formed by winding or stacking a positive electrode sheet and a negative electrode sheet, and a separator is usually arranged between the positive electrode sheet and the negative electrode sheet. Portions of the positive electrode sheet and the negative electrode sheet with active materials constitute main body part 231 of the electrode assembly, and portions of the positive electrode sheet and the negative electrode sheet without active materials constitute tabs 232, respectively. In order to improve the overcurrent capability, tab 232 includes a plurality of tab sheets stacked in layers. During charging and discharging of the battery, the positive active material and the negative active material react with the electrolyte solution, and tabs 232 are connected to terminal post 24 to form a current loop.

Figure 4:
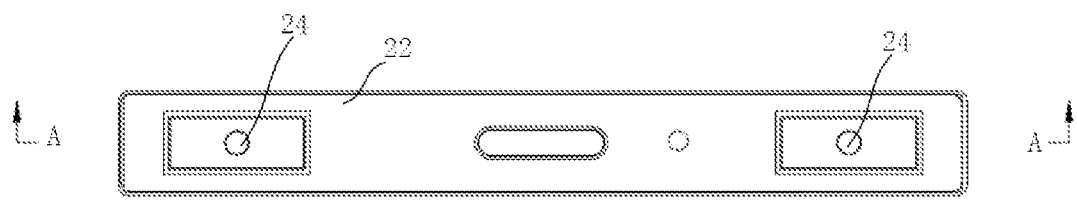
FIG. 4 is a schematic top-view structural diagram of a battery cell according to some embodiments of the present application.
Figure 5:
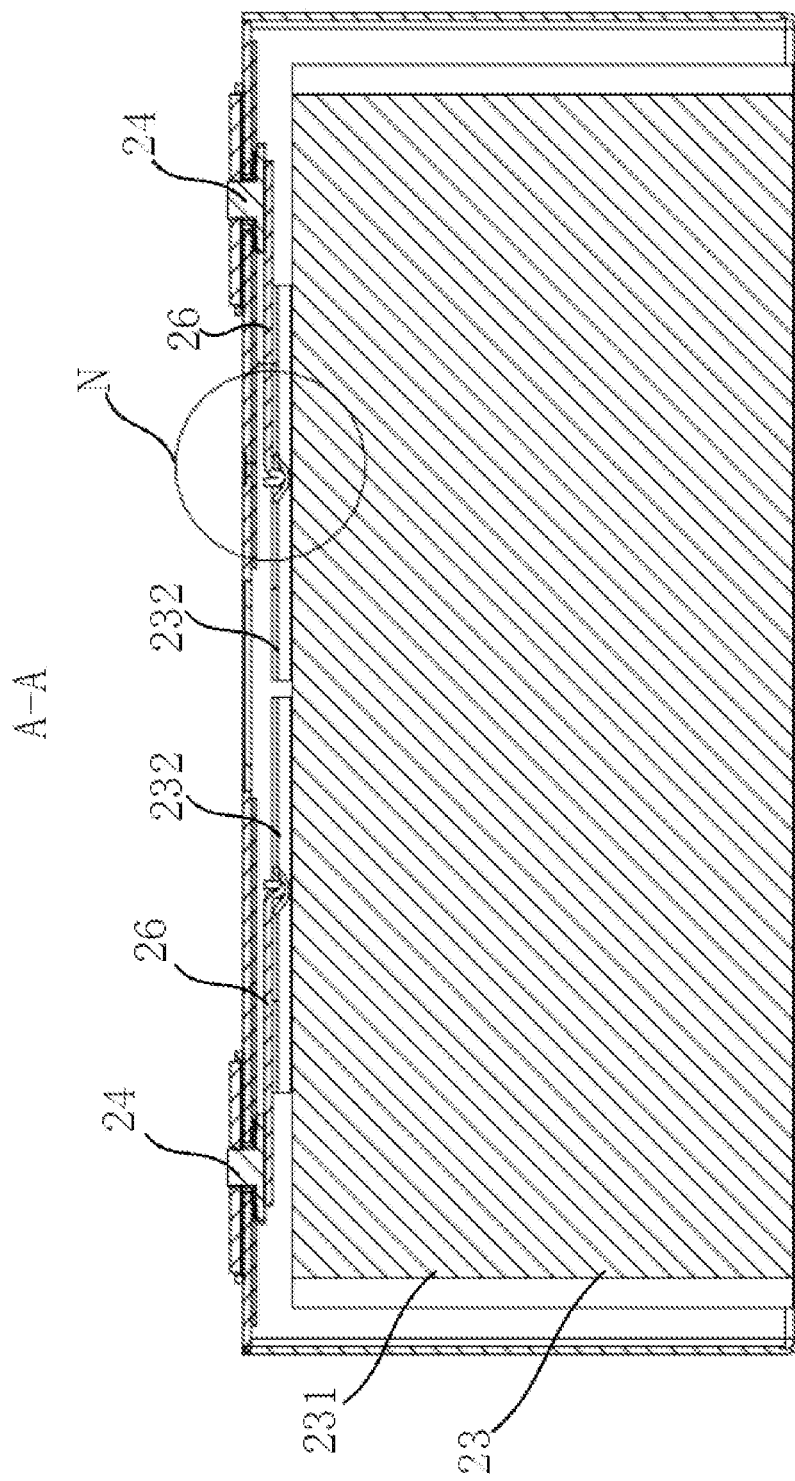
FIG. 5 is a schematic sectional structural diagram of a battery cell in a direction A-A according to some embodiments of the present application.
Figure 6:
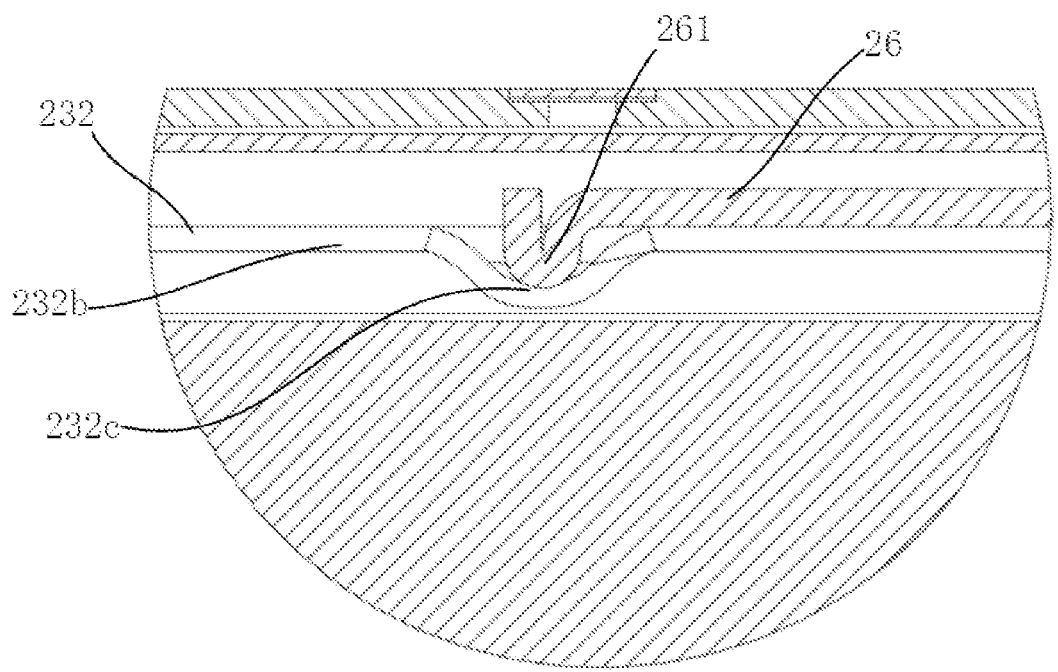
FIG. 6 is a schematic partial enlarged structural diagram of a part N in FIG. 5.
Figure 7:
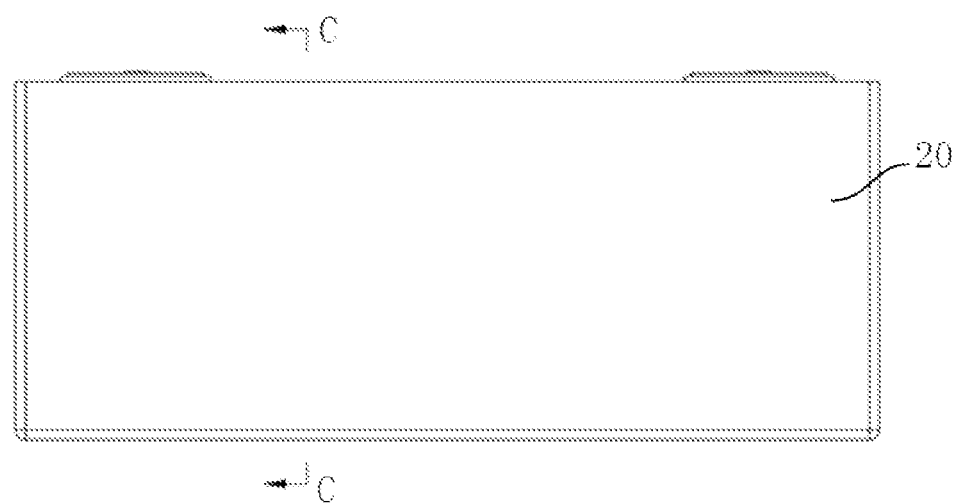
FIG. 7 is a schematic front-view structural diagram of a battery cell according to some embodiments of the present application.
Figure 8:
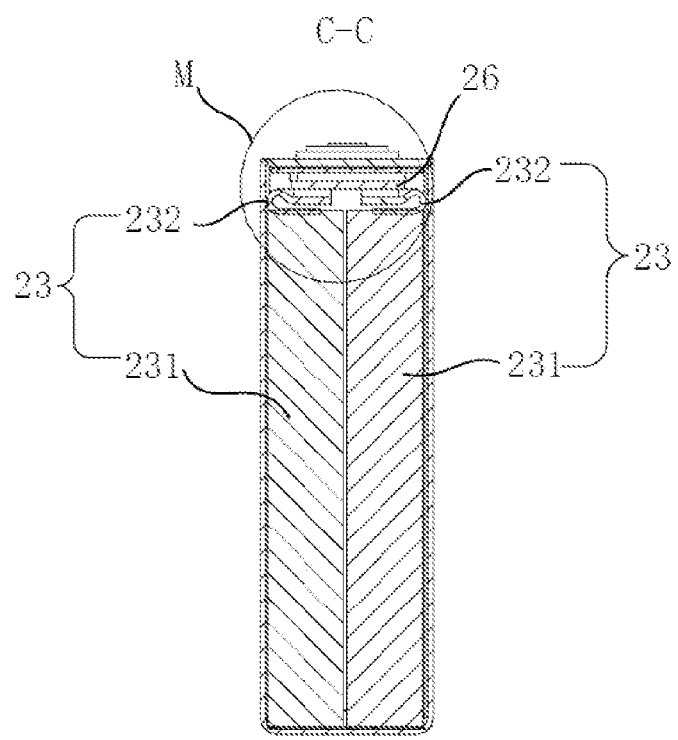
FIG. 8 is a schematic sectional structural diagram of a battery cell in a direction C-C according to some embodiments of the present application.
Figure 9:
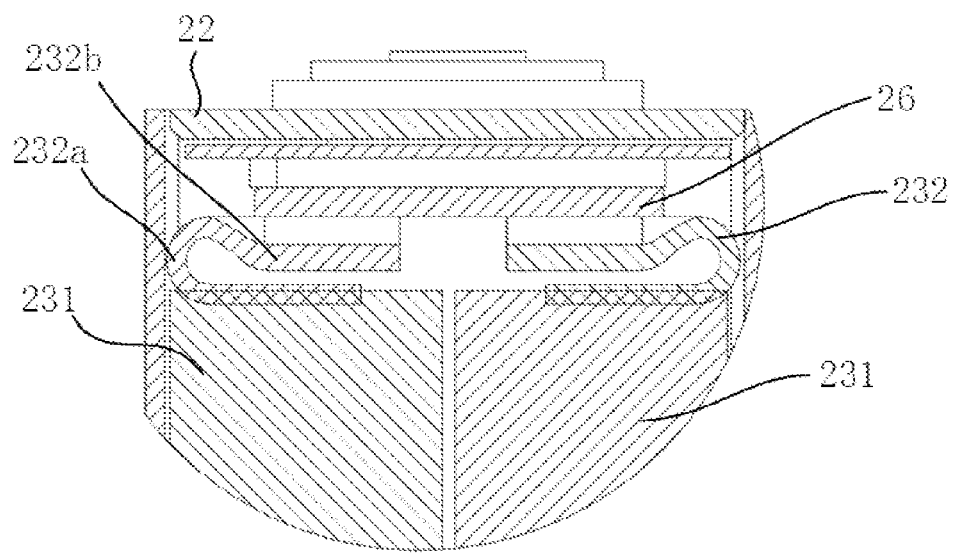
FIG. 9 is a schematic partial enlarged structural diagram of a part N in FIG. 8.
Figure 10:
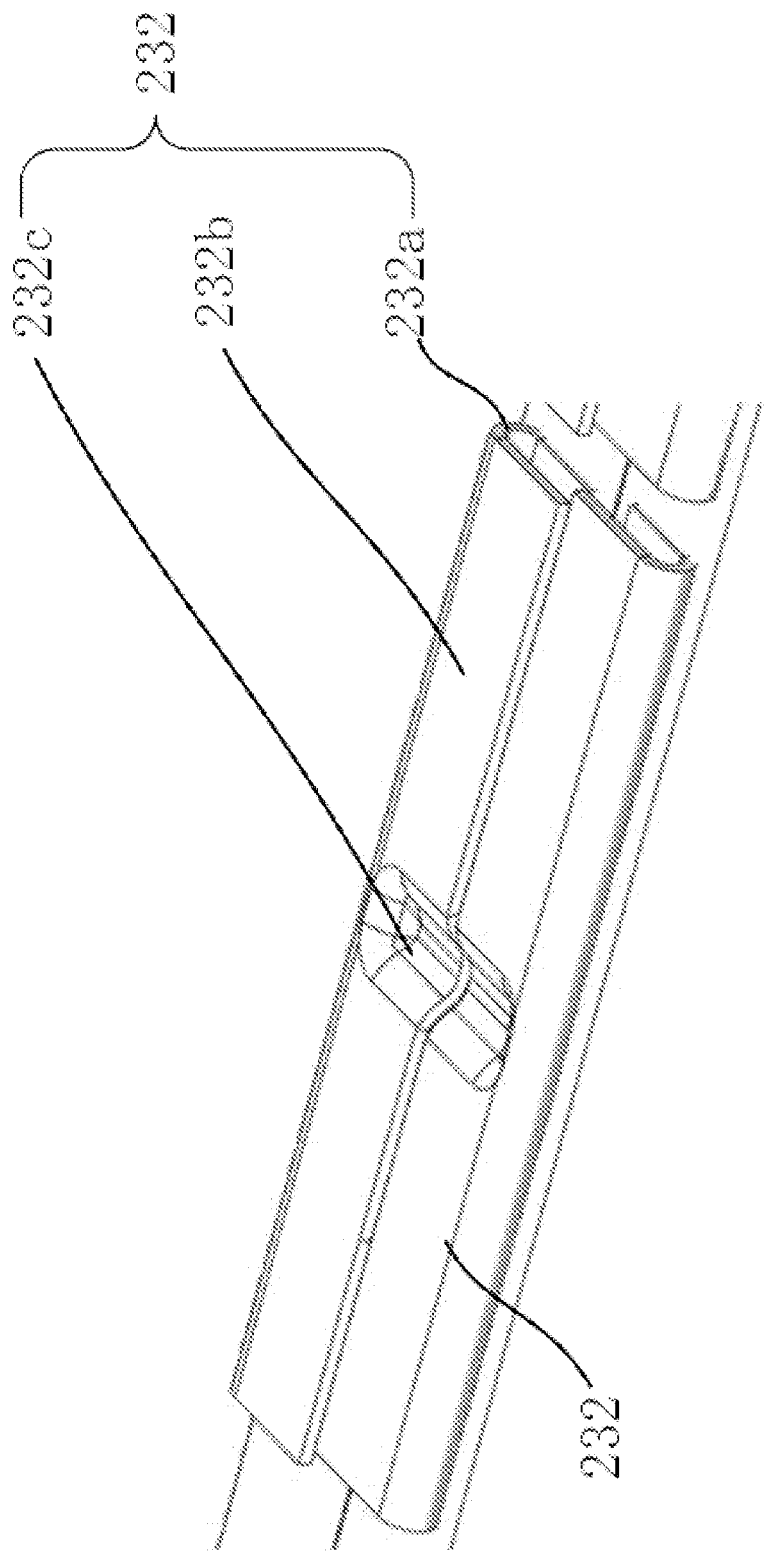
FIG. 10 is a schematic three-dimensional structural diagram of a tab according to some embodiments of the present application.

According to some embodiments of the present application, referring to FIG. 3 and FIG. 4, and further referring to FIG. 5 to FIG. 10, FIG. 3 is a schematic three-dimensional structural diagram of battery cell 20 according to some embodiments of the present application. FIG. 4 is a schematic top-view structural diagram of battery cell 20 shown in FIG. 3, and FIG. 5 is a schematic sectional structural diagram of a battery cell in a direction A-A according to some embodiments of the present application. FIG. 6 is a schematic partial enlarged structural diagram of a part N in FIG. 5. FIG. 7 is a schematic front-view structural diagram of battery cell 20 shown in FIG. 3. FIG. 8 is a schematic sectional structural diagram of a battery cell in a direction C-C according to some embodiments of the present application. FIG. 9 is a schematic partial enlarged structural diagram of a part M in FIG. 8. FIG. 10 is a schematic three-dimensional structural diagram of a tab of an electrode assembly according to some embodiments of the present application.

The present application provides battery cell 20. Battery cell 20 includes electrode assembly 23. Electrode assembly 23 includes main body part 231 and tab 232 extending from main body part 231 to end cover 22 side. Tab 232 is formed by bending a plurality of tab sheets stacked in layers. Tab 232 includes first bending portion 232a and straight portion 232b. Straight portion 232b is connected to main body part 231 through first bending portion 232a. Second bending portion 232c is formed at least on straight portion 232b, and second bending portion 232c protrudes towards main body part 231 side.

As shown in FIG. 3, first direction X in the figure is a length direction of battery cells 20, second direction Y is a thickness direction of battery cells 20, and third direction Z is a height direction of battery cells 20.

Referring to FIG. 4 and FIG. 5, electrode assembly 23 includes two tabs 232 protruding from one side of main body part 231. Two tabs 232 have opposite polarities, and are respectively a positive tab and a negative tab. In other embodiments, two tabs 232 may also protrude from both ends of main body part 231, respectively. In the embodiment shown in FIG. 5 and FIG. 6, the structures of two tabs 232 are the same, and therefore, for the convenience of description, reference numerals of the two tabs are not distinguished. However, it should be further noted here that in other embodiments, the structure of the negative tab may also be different from that of the positive tab. For example, the positive tab is provided with a second bending portion, while the negative tab is not provided with a second bending portion; or the negative tab is provided with a second bending portion, while the positive tab is not provided with a second bending portion, these are all possible embodiments. In other words, in some embodiments, a second bending portion is formed on the straight portion of at least one tab of the positive tab and the negative tab.

The arrangement of second bending portion 232c makes a part of tab 232 generate a protruding deformation towards one side of main body part 231, and this deformation makes the layers of tab 232 close together, forming a local binding of tab 232 and increasing a separation resistance between the layers of tab 232, thereby avoiding the tab bifurcation and improving the safety of the battery.

In the embodiment shown in FIG. 10, second bending portion 232c is formed on straight portion 232b. Moreover, second bending portion 232c extends on straight portion 232b, that is, extends from a free end of straight portion 232b to a connection of straight portion 232b and first bending portion 232a.

According to some embodiments of the present application, second bending portion 232c is formed on straight portion 232b and first bending portion 232a. In other words, second bending portion 232c extends from straight portion 232b to first bending portion 232.

Second bending portion 232c is formed on straight portion 232b and first bending portion 232a, so that an area where the tab is bound is larger, thereby further avoiding the tab bifurcation.

According to some embodiments of the present application, referring to FIG. 10, first bending portion 232a has a first bending axis. Second bending portion 232a has a second bending axis. The second bending axis and the first bending axis have an included angle or are parallel.

Referring to FIG. 10, the first bending axis of first bending portion 232a extends in first direction X, and bending tab 232 along the first bending axis can reduce the space occupied by tab 232 in the height direction of electrode assembly 23. In some embodiments, the second bending axis and the first bending axis are parallel to each other, that is, the second bending axis also extends in first direction X. At this time, second bending portion 232c on the tab protrudes downward to form a binding on the tab, which increases the separation resistance between the layers of the tab, and avoids the tab bifurcation. In some other embodiments, the second bending axis and the first bending axis have an included angle. For example, the second bending axis is arranged obliquely or perpendicularly with respect to the first bending axis. Second bending portion 232c formed in this way makes the layers of the tab converge to the middle of second bending portion 232c, and the separation resistance is greater, thereby avoiding the tab bifurcation.

Referring to FIG. 10, in some embodiments, second bending portion 232c may be formed by processing the tab by a preforming device before assembling of the battery cell, for example, formed by using a compression molding device to press a part of the tab towards the side of the main body part or by clamping both sides of the tab using a special-shaped clamp. At this time, second bending portion 232c on tab 232 is formed by pre-processing, and therefore, the extending direction of tab 232 is not limited. For example, the tab may extend from the main body part to the side of the end cover, or may extend to both ends.

In some other embodiments, second bending portion 232c is formed in the assembling process of the battery cell, that is, the battery cell includes a pressing-down structure for forming the second bending portion of the tab.

According to some embodiments of the present application, referring to FIG. 5 and FIG. 6, battery cell 20 further includes case 21, end cover 22, and a pressing-down structure. Case 21 has an opening, and end cover 22 is arranged at the opening to close the opening. Tab 232 extends from main body part 231 to one side of end cover 22. The pressing-down structure is arranged between tab 232 and end cover 22. Moreover, the pressing-down structure abuts against tab 232 so that tab 232 forms second bending portion 232c.

The pressing-down structure is arranged between tab 232 and end cover 22. In other words, the pressing-down structure is arranged above tab 232, so that after battery cell 20 is assembled, the pressing-down structure can continue to abut against tab 232. Therefore, the shape of second bending portion 232c on tab 232 is maintained continuously, thereby effectively ensuring the continuous converging effect between the various layers of tab sheets of tab 232 and preventing the tab bifurcation.

According to some embodiments of the present application, referring to FIG. 5, battery cell 20 further includes terminal post 24 arranged on end cover 22 and adapter plate 26. Adapter plate 26 is configured to connect terminal post 26 and straight portion 232b of tab 232, and the pressing-down structure is arranged at a position where adapter plate 26 cooperates with straight portion 232b.

Specifically, as shown in FIG. 5, battery cell 20 includes two terminal posts 24 arranged on end cover 22. Two terminal posts 24 are respectively connected to two tabs 232 through two adapter plates 26, respectively. As shown in FIG. 5 and FIG. 6, end portions of two adapter plates 26 are each provided with a pressing-down structure. As shown in FIG. 6 to FIG. 10, the pressing-down structure makes second bending portion 232c to be formed on straight portion 232b of tab 232.

Adapter plate 26 is a component used for connecting terminal post 24 and tab 232, and the pressing-down structure is arranged on adapter plate 26 and at the position where adapter plate 26 cooperates with straight portion 232b. Then, after adapter plate 26 is connected to straight portion 232b of tab 232, the pressing-down structure can naturally form a downward pressing on tab 232, and therefore, this arrangement simplifies the assembling of battery cell 20.

According to some embodiments of the present application, referring to FIG. 6, the pressing-down structure includes protruding portion 261 arranged on the adapter plate.

As shown in FIG. 6, protruding portion 261 is arranged on a lower surface of adapter plate 26 and protrudes towards the side of the main body part. Protruding portion 261 abuts against the upper surface of tab 232 so that tab 232 forms second bending portion 232c facing one side of main body part 231.

According to some embodiments of the present application, the height of protruding portion 261 is 1 mm to 5 mm.

The height of protruding portion 262 refers to a distance between the lowermost end of protruding portion 261 and the lower surface of adapter plate 26. Setting the height of protruding portion 261 within the above range can ensure that the protrusion depth of the second bending portion formed by the tab forms an effective binding between the layers of the tab sheets. If the height of protruding portion 261 is less than 1 mm, the protruding depth of second bending portion 232c formed by pressing of protruding portion 261 will be small, and the binding force at this time will also be small, which cannot better prevent the tab bifurcation. If the height of protruding portion 261 is greater than 5 mm, the protruding depth of second bending portion 232c formed by the protruding portion 261 will be larger, which may cause second bending portion 232c to protrude to a position where second bending portion 232c is in contact with main body part 231, and in this way, a short circuit of contact with main body part 231 may be caused.

According to some embodiments of the present application, the height of protruding portion 261 gradually increases in a direction from first bending portion 232a to straight portion 232b.

A free end of straight portion 232b is easier to disperse, and therefore, in order to make deformation of the free end side of straight portion 232b larger to form a larger binding force, the height of protruding portion 261 is set to gradually increase in the direction from first bending portion 232a to straight portion 232b.

According to some embodiments of the present application, protruding portion 261 and adapter plate 26 are formed integrally.

For example, in the embodiment shown in FIG. 6, protruding portion 261 is formed by bending an end portion of first adapter plate 26. In other embodiments, a protruding portion may be directly formed integrally on the lower surface of the adapter plate when the adapter plate is manufactured.

By integrally forming protruding portion 261 and adapter plate 26, when battery cell 20 is assembled, directly connecting adapter plate 26 and tab 232 can at the same time realize the abutment of protruding portion 261 against tab 232, so as to form second bending portion 232c. Therefore, the assembling process of the battery cell can be simplified.

According to some embodiments of the present application, protruding portion 261 and adapter plate 26 are separate structures, and protruding portion 261 is connected to adapter plate 26. Specifically, protruding portion 261 may be connected to adapter plate 26 by adhering or other connection methods.

Protruding portion 261 and adapter plate 26 are separate structures, so that the position of protruding portion 261 on adapter plate 26 may be changed according to actual requirements in the assembling process. For example, adapter plate 26 includes a first connection region connected to terminal post 24 and a second connection region connected to tab 232, then protruding portion 261 may be arranged on one side of the second connection region as required. In other words, at this time, protruding portion 261 and the first connection region are located on two sides of the second connection region. For another embodiment, adapter plate 26 may further include a second connection region and a third connection region that are connected to tab 232 and are arranged at an interval, and therefore, protruding portion 261 may be arranged between the second connection region and the third connection region as required.

According to some embodiments of the present application, protruding portion 261 has a contact surface abutting against tab 232, and the contact surface includes a curved surface.

Protruding portion 261 mentioned here has a contact surface abutting against the tab, and the contact surface including a curved surface means that a part abutting against the tab is a curved surface, and the entire surface of the protruding portion may be a curved surface, or may be a partially curved surface with other parts being a plane, or the like. For example, in the embodiment shown in FIG. 6, protruding portion 261 is formed by bending the end portion of adapter plate 26 into a U shape. At this time, the lower end of the outer surface of the protruding portion is a curved surface, and the upper end is a plane. In other embodiments, the outer surface of protruding portion 261 may also be a spherical surface.

The contact surface directly abuts against tab 232, and therefore, setting the contact surface as the curved surface can avoid damage to tab 232 when abutting against tab 232.

According to some embodiments of the present application, adapter plate 26 includes a first connection region connected to terminal post 24 and a second connection region connected to tab 232. The pressing-down structure and the first connection region are located at both sides of the second connection region.

Referring to FIG. 5, adapter plate 26 extends in the first direction, the first connection region of adapter plate 26 close to a first end is connected to terminal post 24, and a second end of adapter plate 26 is provided with a pressing-down structure. The second connection region of first adapter plate 26 close to the second end is connected to tab 232, and in other words, the pressing-down structure and the first connection region are located on both sides of the second connection region.

The pressing-down structure and the first connection region are located on both sides of the second connection region, respectively, and in this way, the arrangement of the pressing-down structure has no effect on the connections between adapter plate 26 and terminal post 24 and between the adapter plate and tab 232. During assembling, the original process is still used for connecting adapter plate 26 to terminal post 24 and to tab 232, and the pressing-down structure arranged on adapter plate 26 can naturally form pressing against tab 232.

According to some embodiments of the present application, adapter plate 26 includes a first connection region connected to terminal post 24, and a second connection region and a third connection region connected to tab 232. The pressing-down structure is located between the second connection region and the third connection region.

Adapter plate 26 includes two connection regions that are connected to tab 232 and are arranged at an interval, the two connection regions are respectively the second connection region and the third connection region, and the pressing-down structure is arranged between the second connection region and the third connection region, and therefore, both sides of the pressing-down structure are subject to a connection force between adapter plate 26 and tab 232. Under the limit of the connection forces on the both sides, the pressing-down structure has a small degree of freedom in a height direction, and therefore, the abutment against the tab can be maintained continuously.

In other embodiments in which the tab is processed by a pre-forming device to form a second bending portion, the second bending portion may be arranged at two regions of the tab corresponding to the second connection region and the third connection region. In this way, the degree of freedom of displacement of the second bending portion of the tab in the height direction is small, so that the bending shape thereof may be more effectively maintained.

According to some embodiments of the present application, battery cell 20 further includes a terminal post arranged on end cover 22 and adapter plate 26. Adapter plate 26 is configured to connect the terminal post and the straight portion of the tab, and the pressing-down structure is arranged at positions where adapter plate 26 cooperates with the straight portion and first bending portion 232c.

By arranging the pressing-down structure at the positions where adapter plate 26 cooperates with straight portion 232$b$ and first bending portion 232$a$, second bending portion 232$c$ is formed on straight portion 232$b$ and first bending portion 232$a$ of the tab, so that an area where the tab is bound is larger, thereby further avoiding the tab bifurcation.

Referring to FIG. 11 to FIG. 14, according to some embodiments of the present application, battery cell 20 further includes terminal post 24 arranged on end cover 22 and adapter plate 26. Adapter plate 26 is configured to connect terminal post 24 and tab 232, and pressing-down structure 28 is arranged at a position at one side of end cover 22 that faces tab 232 and is not blocked by adapter plate 26.

Figure 11:
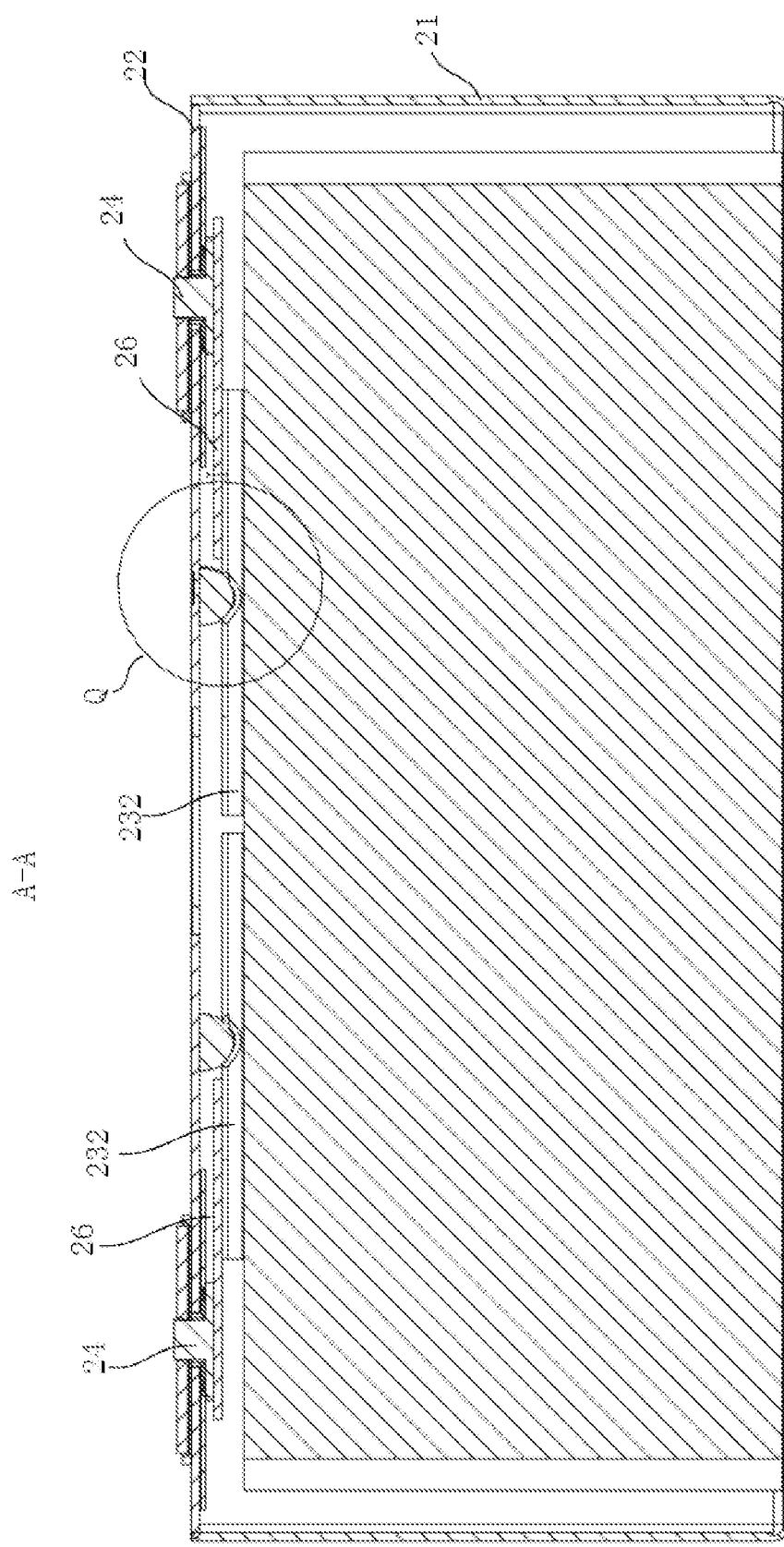
FIG. 11 is a schematic sectional structural diagram of a battery cell in a direction A-A according to some other embodiments of the present application.
Figure 12:
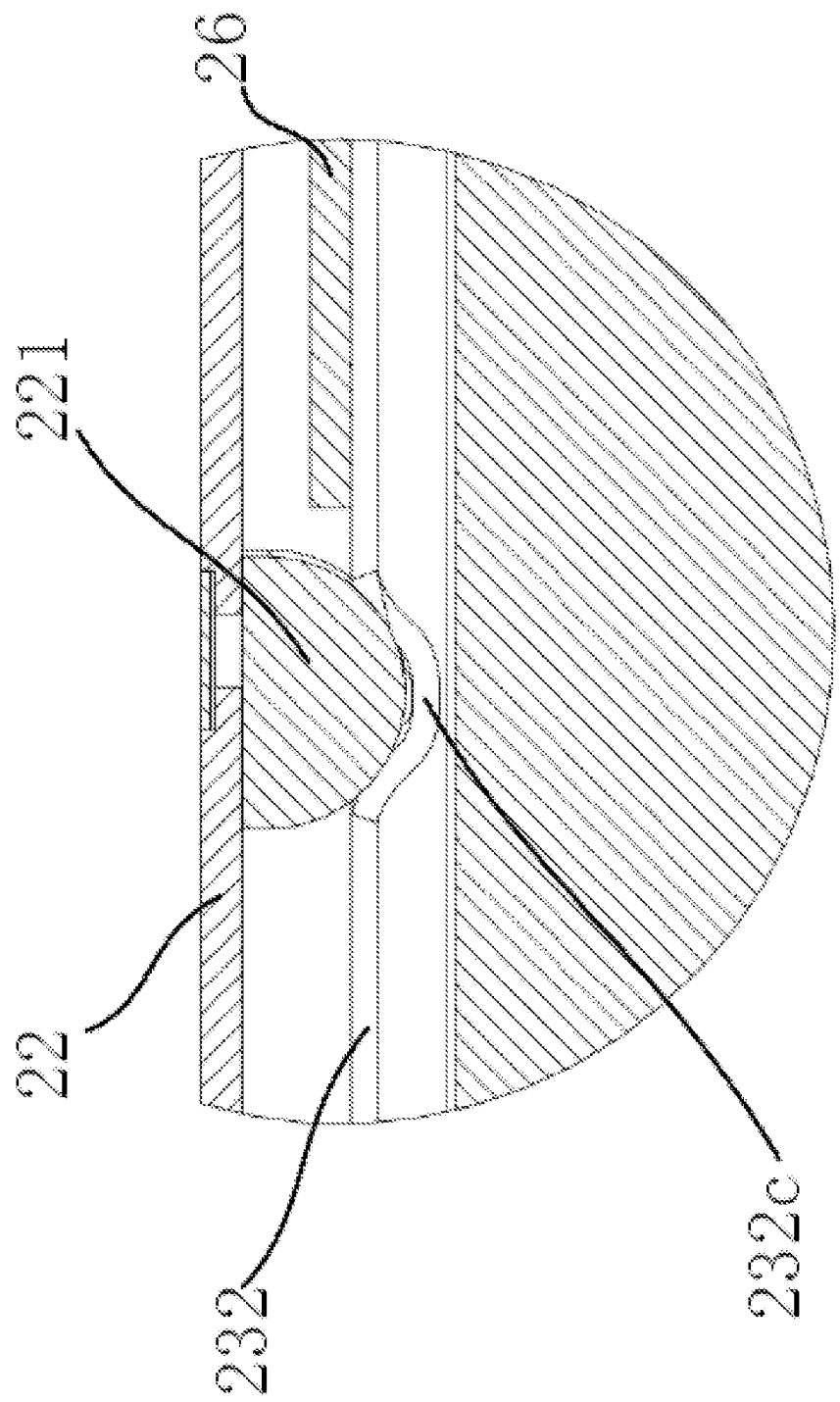
FIG. 12 is a schematic partial enlarged structural diagram of a part Q in FIG. 11.

As shown in FIG. 11 and FIG. 12, battery cell 20 includes case 21, end cover 22, electrode assembly 23, and two terminal posts 24 arranged on end cover 22. Electrode assembly 23 includes main body part 231 and two tabs 232. Two tabs 232 have opposite polarities and both protrude from one side of main body part 231. Both of two tabs 232 are connected to corresponding terminal posts 24 through adapter plate 26 respectively. One side (a lower surface) of end cover 22 facing the tab is provided with a pressing-down structure. As shown in FIG. 11, pressing-down structure 28 is arranged at a position that is not blocked by adapter plate 26. In other words, the pressing-down structure and adapter plate 26 are arranged at an interval, and specifically, the pressing-down structure is arranged on one side of adapter plate 26. Corresponding to two tabs 232, the lower surface of end cover 22 is provided with two pressing-down structures.

End cover 22 is provided with the pressing-down structure, so that when end cover 22 is installed at the opening of case 21, the pressing-down structure can press against the tab so that the tab forms the second bending portion.

In some embodiments, the pressing-down structure and the end cover are arranged separately. In some other embodiments, the pressing-down structure is integrally arranged with the end cover.

In some embodiments, the pressing-down structure is a strip-shaped protrusion arranged on the end cover.

According to some embodiments of the present application, referring to FIG. 10, in a direction of the first bending axis, the pressing-down structure abuts against a portion of the tab close to the middle of the tab.

The pressing-down structure abuts against the portion of the tab close to the middle of the tab, and therefore, in first direction X, second bending portion 232$c$ formed by the pressing-down structure is located in the middle of the tab, so that portions of the tab located at both sides of second bending portion 232$c$ are subject to more balanced binding forces, and each part of the tab can receive a balanced binding force.

According to some embodiments of the present application, battery cell 20 includes two or more electrode assemblies 23 arranged side by side. The pressing-down structure abuts against at least two tabs of the two or more electrode assemblies.

Referring to FIG. 8 and FIG. 9, battery cell 20 includes two electrode assemblies 23. Tabs 232 of two electrode assemblies 23 both extend towards one side of the end cover 22. As shown in FIG. 9, when tabs 232 of two electrode assemblies 23 are bent along the first bending axis, free ends of the straight portions of two tabs 232 are arranged opposite to each other and face the middle of battery cell 20. Adapter plate 26 is connected to two tabs 232 of two electrode assemblies 23, and the pressing-down structure on adapter plate 26 abuts against two tabs 232 of two electrode assemblies 23. As shown in FIG. 10, a second bending portion is formed on of two tabs 232 under the abutment of adapter plate 26.

The pressing-down structure abuts against at least two tabs of the two or more electrode assemblies, so that there is no need to provide a special pressing-down structure for each tab, thereby simplifying the assembling process of the battery cell and simplifying the structure of the battery cell.

According to some embodiments of the present application, electrode assembly 23 includes a positive tab and a negative tab, and a second bending portion is formed on straight portions of the positive tab and the negative tab, respectively.

Referring to FIG. 5, two tabs 232 have opposite polarities, and are respectively a positive tab and a negative tab. Moreover, adapter plates 26 correspondingly connected to two tabs 232 are each provided with a pressing-down structure, so that a second bending portion is formed on two tabs 232, respectively.

The second bending portion is formed on the straight portions of the positive tab and the negative tab, respectively, and in this way, the positive tab and the negative tab can be effectively bifurcated, thereby further improving the safety of the battery cell.

According to some embodiments of the present application, the present application further provides a battery including the battery cell of any of the above solutions.

According to some embodiments of the present application, the present application further provides an electrical apparatus including the battery of any one of the above solutions, the battery being configured to provide electric energy to the electrical apparatus.

The electrical apparatus may be any of the aforementioned devices or systems in which the battery is applied.

According to some embodiments of the present application, a manufacturing method for a battery cell is further provided in the present application, including the following step of: providing electrode assembly 23, electrode assembly 23 including main body part 231 and tab 232, and tab 232 including first bending portion 232$a$ and straight portion 232$b$. Straight portion 232$b$ is connected to main body part 231 through first bending portion 232$a$, second bending portion 232$c$ is formed at least on straight portion 232$b$, and second bending portion 232$c$ protrudes towards one side of main body part 231.

The arrangement of second bending portion arranged on the straight portion of the tab makes a part of the tab generate a protruding deformation towards the side of the main body part, and this deformation makes the layers of the tab close together, forming a local binding of the tab, and increasing the resistance to separation between the layers of the tab, thereby avoiding the tab bifurcation, and improving the safety of the battery.

Figure 15:
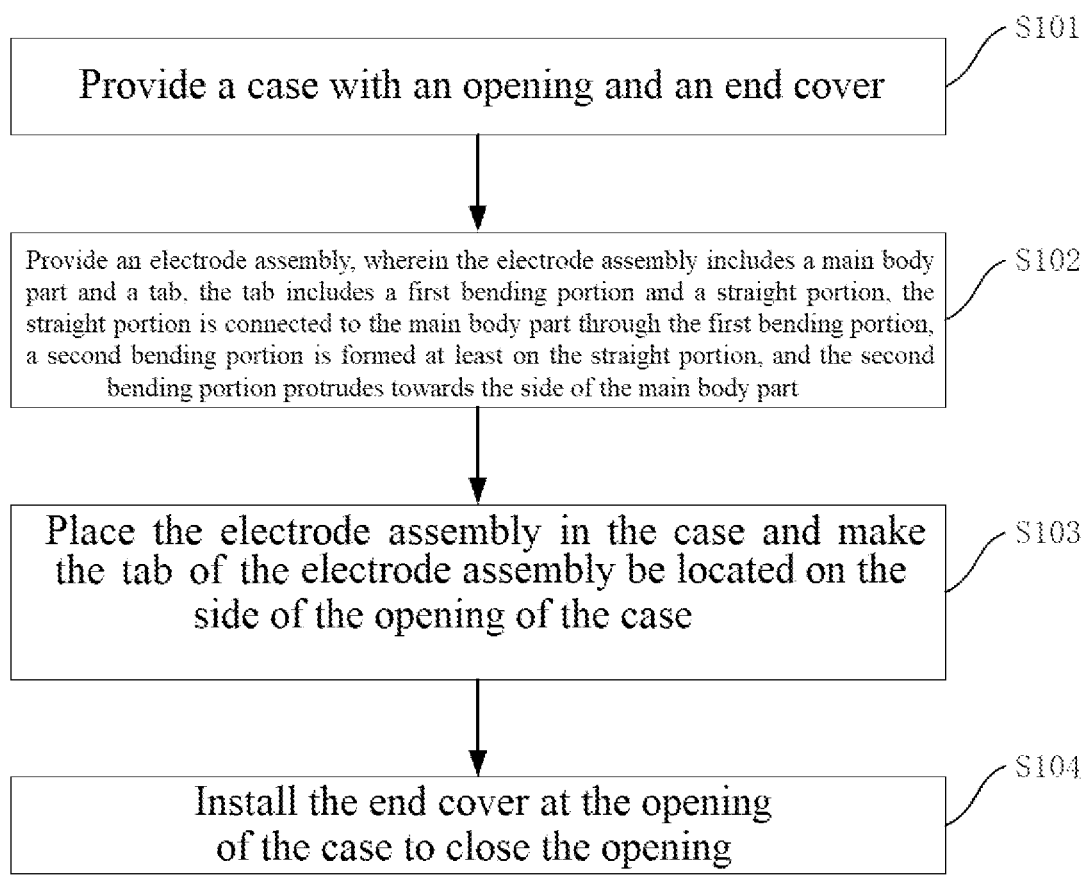
FIG. 15 is a diagram of steps of a manufacturing method for a battery cell according to some embodiments of the present application.

According to some embodiments of the present application, referring to FIG. 15, the manufacturing method for a battery cell includes the following steps:

S101: Providing case 21 with an opening and end cover 22;

S102: Providing electrode assembly 23, wherein electrode assembly 23 includes main body part 231 and tab 232, tab 232 includes first bending portion 232$a$ and straight portion 232$b$, straight portion 232$b$ is connected to main body part 231 through first bending portion 232$a$, second bending portion 232$c$ is formed at least on straight portion 232$b$, and second bending portion 232$c$ protrudes towards one side of main body part 231;

S103: Placing electrode assembly 23 in case 21 and making the tab of electrode assembly 23 be located on the side of the opening of case 21; and S104: Installing end cover 22 at the opening of case 21 to close the opening.

The arrangement of second bending portion arranged on the straight portion of the tab makes a part of the tab generate a protruding deformation towards the side of the main body part, and this deformation makes the layers of the tab close together, forming a local binding of the tab, and increasing the resistance to separation between the layers of the tab, thereby avoiding the tab bifurcation, and improving the safety of the battery.

Second bending portion 232c may be formed by processing the tab by a preforming device before assembling of the battery cell, for example, formed by using a compression molding device to press a part of the tab towards the side of the main body part or by clamping both sides of the tab using a special-shaped clamp.

In some other embodiments, second bending portion 232c is formed during the assembling of the battery cell. The manufacturing method further includes providing a pressing-down structure, the pressing-down structure is arranged between tab 232 and end cover 22, and when end cover 22 is installed at the opening of case 21 to close the opening, the pressing-down structure abuts against tab 232 so that tab 232 forms second bending portion 232c.

According to some embodiments of the present application, the manufacturing method further includes providing terminal post 24 and adapter plate 26, connecting a first end of adapter plate 26 to terminal post 24, arranging the pressing-down structure at a second end of adapter plate 26, and abutting the pressing-down structure against tab 232.

According to some embodiments of the present application, the manufacturing method further includes disposing the pressing-down structure on end cover 22, and installing end cover 22 at the opening of case 21 so that the pressing-down structure abuts against tab 232.

The structure of the battery cell according to the specific embodiment of the present application will be described in detail below according to FIG. 3 to FIG. 14.

FIG. 3 to FIG. 10 show the structure of a battery cell according to a specific embodiment of the present application.

As shown in FIG. 3 to FIG. 5, in this embodiment, battery cell 20 includes case 21, end cover 22, electrode assembly 23, terminal post 24, and adapter plate 26. Case 21 is a square case with an opening, and end cover 22 is arranged at the opening of case 21 to close case 21. End cover 22 is provided with two terminal posts 24 and. Electrode assembly 23 is accommodated in case 21. Electrode assembly 23 includes main body part 231 and tab 232 extending from main body part 231 to end cover 22 side. Adapter plate 26 is connected to terminal post 24 and tab 232.

As shown in FIG. 5 and FIG. 6, an end portion of adapter plate 26 is provided with protruding portion 261 that forms a pressing-down structure. Protruding portion 261 is formed by bending the end portion of adapter plate 26. In other words, protruding portion 261 and adapter plate 26 are formed integrally.

As shown in FIG. 7 to FIG. 9, battery cell 20 includes two electrode assemblies 23 arranged side by side in case 21. Adapter plate 26 is connected to tabs 232 of two electrode assemblies 23 at the same time. Moreover, as shown in FIG. 10, protruding portion 261 on adapter plate 26 abuts against straight portions 232b of two tabs 232 of two electrode assemblies 23 at the same time, so that straight portions 232b of two tabs 232 each form second bending portion 232c.

Adapter plate 26 is a component configured to connect terminal post 24 and tab 232, then after adapter plate 26 is connected to straight portion 232b of tab 232, protruding portion 261 may naturally form a downward pressing on tab 232, so that the tab forms second bending portion 232c. The arrangement of second bending portion 232c makes a part of tab 232 generate a protruding deformation towards one side of main body part 231, and this deformation makes the layers of tab 232 close together, forming a local binding of tab 232 and increasing a separation resistance between the layers of tab 232, thereby avoiding the tab bifurcation and improving the safety of the battery. Moreover, arranging the pressing-down structure on the adapter plate makes the assembling of battery cell 20 simple.

A manufacturing method for a battery cell according to this embodiment includes the following steps:

providing case 21 with an opening, end cover 22, terminal post 24, and adapter plate 26;

providing electrode assembly 23, wherein electrode assembly 23 includes main body part 231 and tab 232, placing electrode assembly 23 in case 21, connecting adapter plate 26 to tab 232, and bending tab 232 along a first bending axis after the connection, wherein after the bending, tab 232 includes first bending portion 232a and straight portion 232b, and straight portion 232b is connected to main body part 231 through first bending portion 232a;

after bending, forming, a protruding portion arranged on adapter plate 26, pressing abutment against straight portion 232b so that second bending portion 232c is formed on straight portion 232b, second bending portion 232c protruding towards one side of main body part 231; and installing end cover 22 at the opening of case 21 to close the opening.

FIG. 11 to FIG. 14 show the structure of a battery cell according to another embodiment of the present application.

The external structure of the battery cell of this embodiment is the same as that of the previous embodiment, so it is not shown repeatedly. Therefore, reference may be made to FIG. 3, FIG. 4, and FIG. 7, FIG. 11 is a sectional diagram in a direction A-A in FIG. 4, and FIG. 13 is a sectional diagram in a direction C-C in FIG. 7.

As shown in FIG. 11, a difference from the previous embodiment is that the pressing-down structure of this embodiment is arranged on end cover 22. Specifically, as shown in FIG. 12, protruding portion 221 is arranged on one side of end cover 22 facing tab 232. Protruding portion 221 is set at a position that is not blocked by adapter plate 26, so that when end cover 22 is installed, protruding portion 221 may be directly pressed against the straight portion of tab 232 so that the straight portion of tab 232 forms second bending portion 232c.

Figure 13:
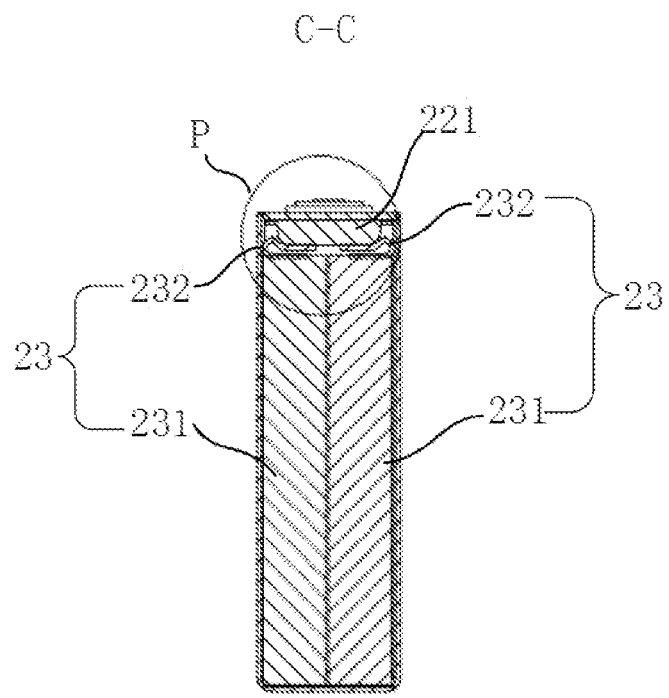
FIG. 13 is a schematic sectional structural diagram of a battery cell in a direction C-C according to some other embodiments of the present application.
Figure 14:
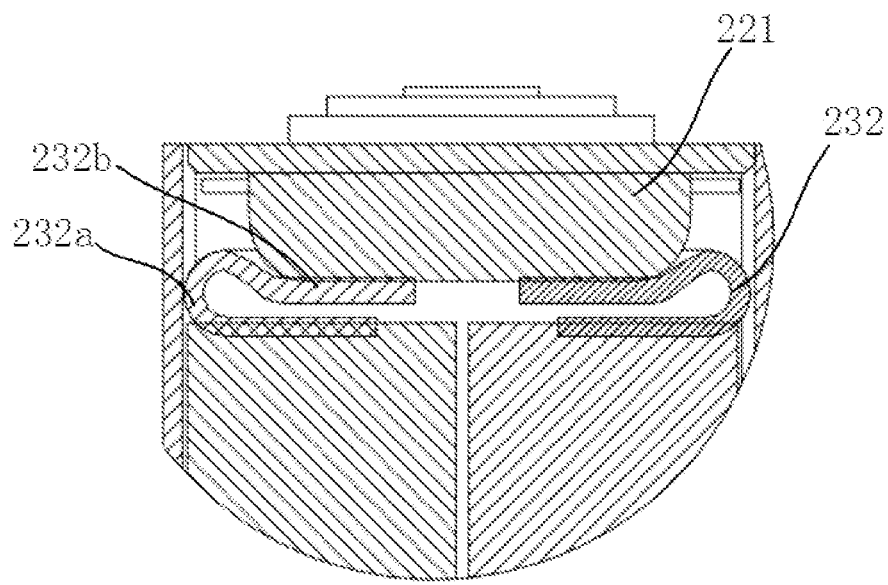
FIG. 14 is a schematic partial enlarged structural diagram of a part P in FIG. 13.

Similarly, as shown in FIG. 13 and FIG. 14, the battery cell includes two electrode assemblies 23, and two electrode assemblies 23 are arranged in case 21 side by side. Moreover, protruding portion 221 may press against tab 232 of two electrode assemblies 23 at the same time, so that two tabs 232 each form second bending portion 232c at the same time.

Specifically, protruding portion 221 is a strip-shaped protrusion arranged on a lower surface of end cover 22, and a cross-sectional shape of protruding portion 221 is a semicircle.

A manufacturing method for a battery cell according to this embodiment includes the following steps:

providing case 21 with an opening, end cover 22, terminal post 24, and adapter plate 26;

providing electrode assembly 23, wherein electrode assembly 23 includes main body part 231 and tab 232, placing electrode assembly 23 in case 21, connecting adapter plate 26 to tab 232, and bending tab 232 along a first bending axis after the connection, wherein after the bending, tab 232 includes first bending portion 232a and straight portion 232b, and straight portion 232b is connected to main body part 231 through first bending portion 232a; and installing end cover 22 at the opening of case 21 to close the opening, and making protruding portion 221 on end cover 22 to form pressing abutment against straight portion 232b so that second bending portion 232c is formed on straight portion 232b, second bending portion 232c protruding towards one side of main body part 231.

Finally, it should be noted that the above examples are merely used for illustrating rather than limiting the technical solutions of the present application. Although the present application has been described in detail with reference to the above various examples, those of ordinary skill in the art should understand that the technical solutions specified in the above various examples can still be modified, or some or all of the technical features therein can be equivalently substituted; and such modifications or substitutions do not make the essence of the corresponding technical solutions depart from the scope of the technical solutions of the various examples of the present application, which shall fall within the scope of the claims and the specification of the present application. In particular, the technical features mentioned in the various examples can be combined in any manner as long as there is no structural conflict. The present application is not limited to the specific examples disclosed herein, but rather includes all technical solutions falling within the scope of the claims.

What is claimed is:

1. A battery cell, comprising an electrode assembly, a case, an end cover, and a pressing-down structure, wherein:
the electrode assembly comprises a main body part and a tab extending from the main body part, and the tab is formed by bending a plurality of tab sheets stacked in layers;
the tab comprises a first bending portion and a straight portion, and the straight portion is connected to the main body part through the first bending portion;
a second bending portion is formed at least on the straight portion, and the second bending portion protrudes towards the side of the main body part; and
the case has an opening, the end cover is arranged at the opening to close the opening, the tab extends from the main body part to the side of the end cover, the pressing-down structure is arranged between the tab and the end cover, and the pressing-down structure abuts against the tab, so that the tab forms the second bending portion.

2. The battery cell according to claim 1, wherein the second bending portion is formed on the straight portion and the first bending portion.

3. The battery cell according to claim 1, further comprising a terminal post arranged on the end cover and an adapter plate, wherein the adapter plate is configured to connect the terminal post and the straight portion of the tab, and the pressing-down structure is arranged at a position where the adapter plate cooperates with the straight portion.

4. The battery cell according to claim 1, further comprising a terminal post arranged on the end cover and an adapter plate, wherein the adapter plate is configured to connect the terminal post and the straight portion of the tab, and the pressing-down structure is arranged at a position where the adapter plate cooperates with the straight portion and the first bending portion.

5. The battery cell according to claim 3, wherein the pressing-down structure comprises a protruding portion arranged on the adapter plate.

6. The battery cell according to claim 5, wherein the height of the protruding portion is 1 mm to 5 mm.

7. The battery cell according to claim 5, wherein the height of the protruding portion is gradually increased in a direction from the first bending portion to the straight portion.

8. The battery cell according to claim 5, wherein the protruding portion and the adapter plate are formed integrally; or the protruding portion and the adapter plate are separate structures, and the protruding portion is connected to the adapter plate.

9. The battery cell according to claim 5, wherein the protruding portion has a contact surface abutting against the tab, and the contact surface comprises a curved surface.

10. The battery cell according to claim 3, wherein the adapter plate comprises a first connection region connected to the terminal post and a second connection region connected to the tab, and the pressing-down structure and the first connection region are located on both sides of the second connection region.

11. The battery cell according to claim 3, wherein the adapter plate comprises a first connection region connected to the terminal post, and a second connection region and a third connection region connected to the tab, and the pressing-down structure is located between the second connection region and the third connection region.

12. The battery cell according to claim 1, further comprising a terminal post arranged on the end cover and an adapter plate, wherein the adapter plate is configured to connect the terminal post and the tab, and the pressing-down structure is arranged on the side of the end cover facing the tab and at a position that is not blocked by the adapter plate.

13. The battery cell according to claim 1, wherein, in a direction of the first bending axis, the pressing-down structure abuts against a portion of the tab close to the middle of the tab.

14. The battery cell according to claim 1, wherein the electrode assembly is one of two or more electrode assemblies of the battery cell arranged side by side, and the pressing-down structure abuts against at least two tabs of the two or more electrode assemblies.

15. The battery cell according to claim 1, wherein the electrode assembly comprises a positive tab and a negative tab, and straight portions of the positive tab and the negative tab are each provided with a second bending portion.

16. A battery, comprising the battery cell according to claim 1.

17. An electrical apparatus, wherein the electrical apparatus comprises the battery according to claim 16, and the battery is configured to provide electric energy.

* * * * *